US010235580B2

(12) United States Patent
Belzner et al.

(10) Patent No.: US 10,235,580 B2
(45) Date of Patent: Mar. 19, 2019

(54) METHOD AND SYSTEM FOR AUTOMATIC DETECTION OF PARKING ZONES

(71) Applicant: Bayerische Motoren Werke Aktiengesellschaft, Munich (DE)

(72) Inventors: Heidrun Belzner, Seefeld (DE); Daniel Kotzor, Seefeld (DE); Vladimir Haltakov, Munich (DE); Andrej Maya, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/720,470

(22) Filed: Sep. 29, 2017

(65) Prior Publication Data
US 2018/0025238 A1    Jan. 25, 2018

Related U.S. Application Data

(63) Continuation of application No. PCT/EP2016/055502, filed on Mar. 15, 2016.

(30) Foreign Application Priority Data

Apr. 1, 2015   (DE) ........................ 10 2015 205 855

(51) Int. Cl.
G06K 9/00      (2006.01)
G08G 1/04      (2006.01)
G08G 1/14      (2006.01)

(52) U.S. Cl.
CPC ..... G06K 9/00812 (2013.01); G06K 9/00651 (2013.01); G06K 9/00785 (2013.01);
(Continued)

(58) Field of Classification Search
CPC ........... G06K 9/00812; G06K 9/00651; G06K 9/00785; G06K 9/00818; G08G 1/04; G08G 1/143; G08G 1/144; G08G 1/147
See application file for complete search history.

(56) References Cited

U.S. PATENT DOCUMENTS

2012/0135746 A1*  5/2012  Mohlig ................ G01S 5/0018
                                                        455/456.1
2012/0185161 A1   7/2012  Zobel
(Continued)

FOREIGN PATENT DOCUMENTS

DE    10 2009 048 323 A1    4/2011
DE    10 2011 003 772 A1    8/2012
(Continued)

OTHER PUBLICATIONS

International Search Report (PCT/ISA/210) issued in PCT Application No. PCT/EP2016/055502 dated Jun. 23, 2016 with English translation (seven pages).
(Continued)

Primary Examiner — Leon Flores
(74) Attorney, Agent, or Firm — Crowell & Moring LLP

(57) ABSTRACT

A method automatically detects parking zones in at least one residential street, wherein a) a computing unit is provided; b) information in the form of panoramic images of the at least one residential street is inputted from an external data store; c) information in the form of street data of the at least one residential street is inputted from a map database; d) an internal database is generated, which persists the panoramic images; e) the inputted panoramic images are analyzed for the presence of vehicles; f) the inputted panoramic images are analyzed for the presence of street signs and traffic signs; g) from the analyses of the presence of vehicles and the presence of street signs and traffic signs for at least one selected residential street, expected existing no-parking/no-stopping zones are determined; h) a data set that contains the detected information regarding identified vehicles, street signs, and the markings of no-parking/no-stopping zones and parking zones is generated, and i) the information contained in the data set is visualized on a terminal unit.

12 Claims, 3 Drawing Sheets

(52) U.S. Cl.
CPC .......... *G06K 9/00818* (2013.01); *G08G 1/04* (2013.01); *G08G 1/143* (2013.01); *G08G 1/144* (2013.01); *G08G 1/147* (2013.01)

(56) References Cited

U.S. PATENT DOCUMENTS

| | | |
|---|---|---|
| 2012/0200430 A1 | 8/2012 | Spahl |
| 2013/0258107 A1 | 10/2013 | Delibaltov et al. |
| 2014/0132767 A1 | 5/2014 | Sonnabend et al. |
| 2014/0340242 A1 | 11/2014 | Belzner et al. |
| 2015/0009047 A1 | 1/2015 | Ashkenazi et al. |
| 2015/0057920 A1 | 2/2015 | Von Zitzewitz et al. |

FOREIGN PATENT DOCUMENTS

| | | |
|---|---|---|
| DE | 10 2011 084 993 A1 | 4/2013 |
| DE | 10 2012 201 472 A1 | 8/2013 |
| DE | 10 2012 216 994 A1 | 3/2014 |
| DE | 10 2012 025 067 A1 | 6/2014 |
| DE | 10 2013 204 843 A1 | 10/2014 |

OTHER PUBLICATIONS

German-language Written Opinion (PCT/ISA/237) issued in PCT Application No. PCT/EP2016/055502 dated Jun. 23, 2016 (eight pages).
German Search Report issued in counterpart German Application No. 10 2015 205 855.7 dated Apr. 21, 2016 with partial English translation (13 pages).

\* cited by examiner

METHOD AND SYSTEM FOR AUTOMATIC DETECTION OF PARKING ZONES

CROSS REFERENCE TO RELATED APPLICATIONS

This application is a continuation of PCT International Application No. PCT/EP2016/055502, filed Mar. 15, 2016, which claims priority under 35 U.S.C. § 119 from German Patent Application No. 10 2015 205 855.7, filed Apr. 1, 2015, the entire disclosures of which are herein expressly incorporated by reference.

BACKGROUND AND SUMMARY OF THE INVENTION

The present invention relates to methods and a system for the automatic detection of parking zones on at least one street.

With the increasing number of vehicles in a confined space, parking information is becoming increasingly important. In the past, manual counts of parking spots were taken and the position of said parking spots was recorded. Construction measures mean that the number of parking spots and the position thereof is continually changing, however.

Modern automobiles already have ultrasonic sensors and cameras installed that are capable of surveying parking spots or parking spaces and in this way of allowing automatic parking, for example. A method already known from DE 10 2012 201 472 A1 takes the vehicle internal camera images as a basis for detecting parking spots and free parking spaces.

The previous system has considerable disadvantages, however. In order to record the parking spot situation in a region, it is necessary to travel along every road in this region at least once. In this case, the roads are traveled along at different rates. Complete coverage of a region is not influenceable and lengthy. The camera images are highly dependent on where the vehicles travel on the road (e.g. distance from the curb) and what the lighting is like. In addition, it is often only possible to register the right hand side of the road. The vehicle-based method is further very computation time intensive.

It is therefore an object of the present invention to overcome the known disadvantages and to provide a method and a system that permits ascertainment of parking zones on at least one street.

The subject of the present invention is a method for the automatic detection of parking zones on at least one street, in which a) a computing unit is provided,
b) information in the form of panorama images of the at least one street is read in from an external data memory,
c) information in the form of road data for the at least one street is read in from a map database,
d) an internal database is produced that persists the panorama images,
e) the panorama images read in are analyzed for the presence of vehicles,
f) the panorama images read in are analyzed for the presence of road signs and traffic signs,
g) the analyses of the presence of vehicles and the presence of road signs and traffic signs are used to determine, for at least one selected street, no-existing parking/no-stopping zones that are to be expected,
h) a data record is produced and stored that contains the determined information pertaining to detected vehicles and road signs and also the markings for no-parking/no-stopping zones and parking zones, and
i) the information contained in the data record is visualized on a terminal.

One preference according to the invention is a method in which the panorama images read in in step b) are satellite photographs or images of the at least one street that are produced by camera movements.

One preference is also a method in which the panorama images comprise information pertaining to the geoposition of the panorama image, the direction of travel, the road name and/or pertaining to the depth map, wherein the information is historic data.

A further preference is a method in which the road data read in in step c) comprise information pertaining to road lanes and/or pertaining to the road type.

A particular preference according to the invention is a method in which the information in the form of panorama images and road data is transmitted by way of an interface of the computing unit that is communicatively connected to the internal database and/or to an external data memory and/or to a map database.

One preference according to the invention is also a method, wherein in step e) the analysis of the vehicle detection is performed by way of segmentation of the panorama images.

An additional preference is a method, wherein in step f) the analysis of the traffic signs and road signs is performed by way of the recognition of the shape and coloration of the road signs.

One preference in this case is a method in which the analysis is performed by using image recognition software.

One preference according to the invention is also a method, wherein in step i) the information contained in the data record is visualized by virtue of said information being depicted on a separate display of a terminal.

The method has at least the following segments.

Read in of Satellite Images

In order to go over a city or a region in automated fashion completely, there is the option of evaluating panorama images in automated fashion. In one preferred embodiment, this is accomplished by extracting data from Google Street View. There, it is possible to obtain panorama images produced by Google containing information pertaining to the position of the image, direction of travel, road name and depth map. The system allows a subregion to be selected in a map, such as Google Street View, for example. Based on this, the adjoining roads are gone through from image to image by calling up the Google Street View API.

Integration of Map Data

Map data provide the number of lanes on a road and the type of said road. On this basis, the necessary zoom level or the angle of the camera images can be set. In addition, the map data provide support for the validation—for example where a road belongs to a road category in which it is not permitted to park.

Performance of Vehicle Detection

The method used is based on computer vision methods. It consists of the following steps:

Segmentation of Images

Classification of components such as vehicle or road.

Counting of the vehicles on the basis of the size of images, position in the image, etc.

Since a learning method is involved, a volume of data comprising labeled images is required as training.

Performance of Sign Recognition

Two methods are used for recognizing signs. One method recognizes shapes while the other method specifically evaluates the coloration of the images. Ultimately, the intersection of the recognized signs is used. In this case too, it is again necessary to use training data for the learning of the method.

Fusion of the Detected Signs and Vehicles

The production of parking data requires parking areas and no stopping zones to be detected. Although it is possible to infer valid parking areas on the basis of the detected vehicles, incorrectly parked vehicles mean that this is not reliable information. On the other hand, the "nonexistence" of vehicles does not allow a no stopping zone to be inferred either. For this reason, the information about detected vehicles is fused with detected sign positions. In one preferred embodiment, this involves the number of vehicles being analyzed around a detected sign. If said number is below a specific percentage/surface area, then a no stopping zone is detected.

Visualization and Style of Result

The system allows both visualization of the detected vehicles and signs and the marking of no stopping and parking zones. Further, a system is provided that goes over roads in panorama images in automated fashion and performs detection of parking vehicles and parking zones.

For visualization purposes, it is particularly possible for KML files to be used. KML is the abbreviation for keyhole markup language and is a markup language for geodata. Such files are suitable for the superimposition of and for combination with geographical maps of all kinds. The results and data records determined according to the invention from the image recognition modules can be converted into KML files and thus visualized together with other map data.

The present invention additionally provides a computer program product that is loadable directly into an internal memory of a computing unit and comprises software code or portions thereof that are executable for the purpose of carrying out the method steps according to the invention when the computer program product is executed on a computing unit.

Finally, the present invention provides a system for the automatic detection of parking zones on at least one street, comprising
a) at least one computing unit,
b) at least one external data memory with panorama images,
c) at least one map database with road data,
d) at least one internal database,
e) at least one piece of image recognition software for analyzing the existing vehicles and the existing no stopping signs and traffic signs, and
f) at least one terminal for visualizing information.

The system according to the invention therefore has the following components: interface(s) to provider(s) of panorama images and extraction of images in the chosen area; interface(s) to the map database in order to evaluate road data; database and design thereof in order to persist image data and attributes; interface to the image recognition software (vehicle detection); interface to the image recognition software (sign detection); module for fusing the results of the detections and module for visualizing the results and storing the data.

The present invention and the method provided thereby and also the system and the computer program product have a series of advantages. Using the system according to the invention, the method according to the invention can be used to initialize or map the parking situation in a city or a new region in automated fashion and to make a statement about available parking zones.

Other objects, advantages and novel features of the present invention will become apparent from the following detailed description of one or more preferred embodiments when considered in conjunction with the accompanying drawings.

DETAILED DESCRIPTION OF THE DRAWINGS

The exemplary embodiments below explain the invention in more detail without restricting the scope of the invention. Further configurations of the invention can be formed by a person skilled in the art taking into consideration the solutions presented herein, without departing from the spirit and scope of the described invention.

The present invention is used to provide an automobile user with an overview of the parking spot availability to be expected at a particular location. In this case, there is initially provision for the automobile user to be notified of whether there might generally be parking spots available at the destination, and to what extent. Establishing whether there are actually free parking spots available is not the object of the invention initially.

Figure 1:
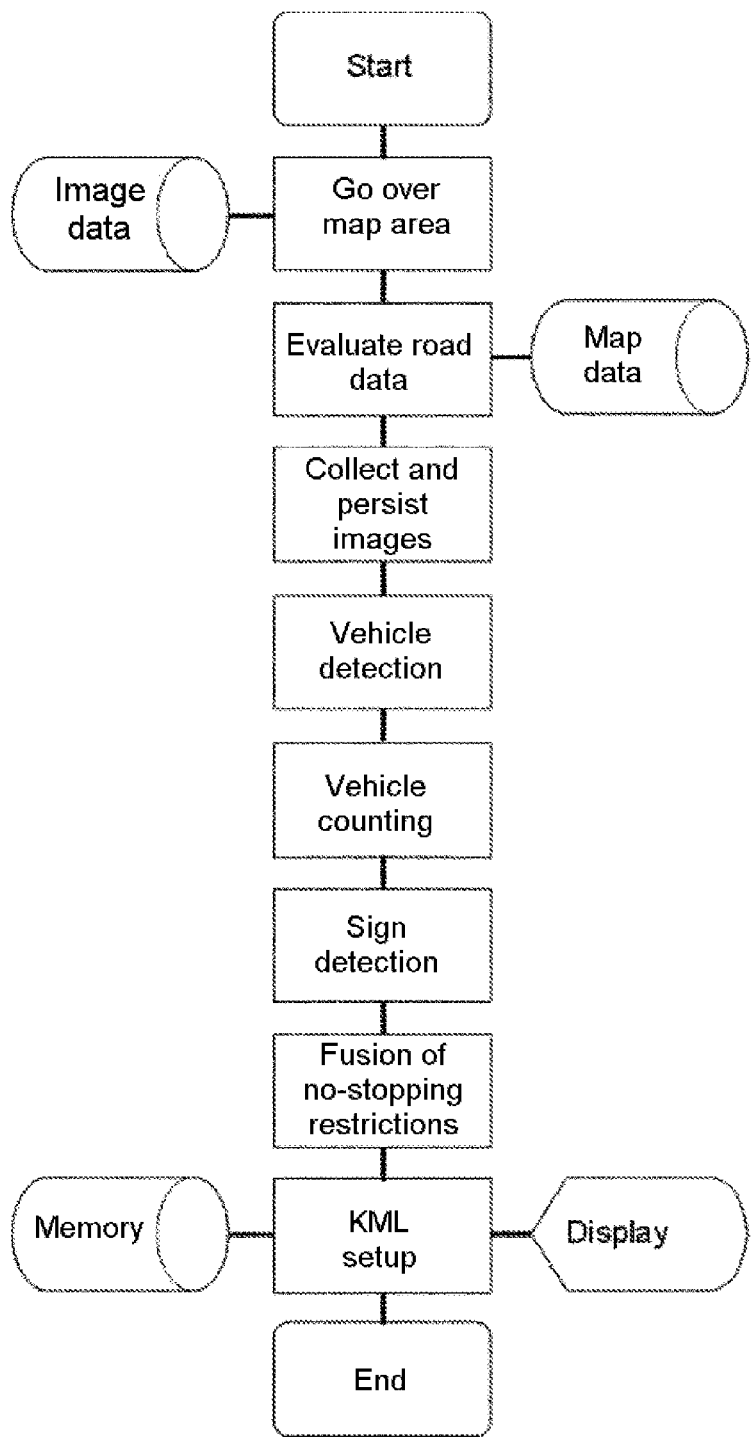
FIG. 1 is a flowchart for an embodiment of the method according to the invention.

FIG. 1 depicts the flowchart for an embodiment of the present invention in detail. This embodiment is explained and described below in more detail.

Initially, at least one street is stipulated or identified in which the parking zones need to be determined. This stipulation can be made by a user, for example a person who wishes to travel to a specific location using an automobile. This stipulation can also be made by the provider of the service, however, when said provider stipulates in advance those streets in which this service is intended to be provided. This information can then be accessed by the user (end customer) as a follow up. The stipulated location may be not only a street but also a broader region, however, such as multiple contiguous streets or a district, for example. To stipulate the location, the user uses a computer program product according to the invention, which is executable on any computing unit. Such computing units may be personal computers (PCs), laptops, notebooks, smartphones and the like.

The computer program product then depicts a map or a map detail, for example, when the user uses search terms to input a specific place name into the computing unit. The user then selects that area on the displayed map for which the detection of parking zones needs to be performed.

The computer program that the computer program product contains is now executed in order to determine the parking zones in the area chosen by the user. To this end, the image data for the chosen area are read in from an external data memory. The external data memory for the image data may be a data memory of an external provider that has captured and provided applicable image data, preferably in the form of panorama images and/or video sequences, beforehand. These image or video data are usually historic data.

Applicable data suitable according to the invention have been captured and stored in the form of satellite images and/or video recordings from camera movements, for example by means of the provider Google. These data can be accessed using the programs such as Google Earth or Street View provided by Google. Data from other providers can also be used. There is also provision according to the invention for a combination of data from different providers.

According to the invention, images of the selected area are now extracted from the applicable aforementioned image data of the selected area. The number of images extracted is in this case chosen such that the whole selected area is depicted as completely as possible. Overlaps need to be avoided in this case in order to allow precise evaluation. Such overlap areas can be detected and eliminated using known image processing programs.

In a further step, the extracted images are now analyzed for vehicles. In this case, the extracted images can be segmented beforehand in order to reduce the volume of data. During the analysis, components such as vehicles or roads are now initially classified. This involves vehicles being detected on the basis of the size of the images or the position in the image, for example. Once the individual vehicles have been identified and detected, it is possible to determine the number of said vehicles in the applicable segment of the image. This is a learning method, which means that a volume of data comprising labeled images is needed for training.

In a further step, the extracted images are now analyzed for road signs. Various methods are suitable for performing sign recognition. One method uses the different shapes of the road signs. Road signs that indicate stopping and/or parking restrictions are always circular. Additionally, another method uses the different coloration of the road signs in order to recognize and associate them. Road signs that signal stopping and parking restrictions are always in the colors blue and red, for example. The pooling of this information allows the signs to be explicitly recognized and associated. In this case too, it is again necessary to use training data in the form of appropriately labeled images for learning.

There is now additionally provision for the valid parking zones to be determined from the detected and recorded vehicles and also the detected and recorded sign information. This requires the respective parking areas and the no stopping and no parking zones to be detected. Vehicles that are possibly parked incorrectly mean that it is not possible to infer a valid parking zone solely from the determined vehicles. Further, the absence of vehicles in a street is not a valid indication of a no parking zone. Instead, it is thus necessary to fuse the data of the detected vehicles with those of the detected signs and the positions thereof. This is done in a further step of the method according to the invention. This fusion explicitly determines the parking zones on the respective street. In this case, according to the invention, the number of vehicles is analyzed around a detected sign. If this number of vehicles is below a previously defined limit, then a no stopping zone is detected. Such a limit can be determined or stipulated, according to the invention, from the percentage of vehicles or the surface area taken up by the vehicles, for example.

The parking zones determined in the previous step are now converted into a data record and said data record is then stored in a data memory. This data record then has the respective already existing files of the image data and/or map data superimposed on it. In the embodiment described in FIG. 1, these data records are converted into KML files in order to superimpose the map of the street onto the data records of the determined and detected parking zones. The superimposed files obtained in this way then contain the applicable parking zones that are available on the chosen street. The file superimposed in this way is then visualized for the user of the system and shown on a monitor or screen, for example.

Figure 2:
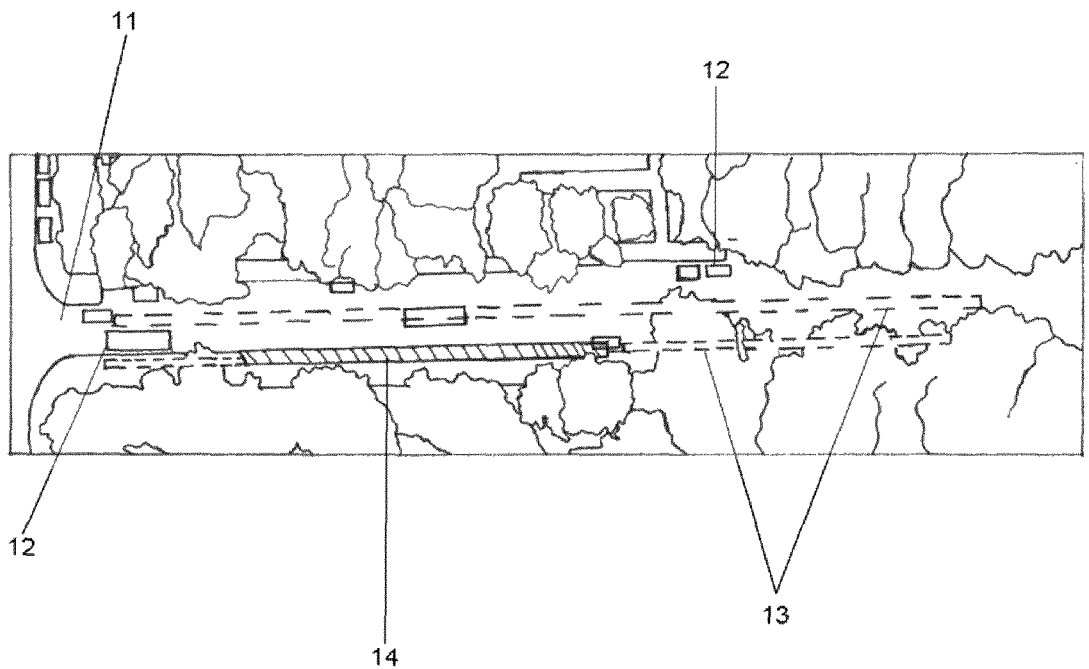
FIG. 2 shows the visual depiction of an exemplary result of the method according to the invention.

Such visualization according to the invention is shown in FIG. 2. FIG. 2 shows a plan view of a street 11 as produced by a satellite image. At the sides of the street 11, it is possible to identify trees and other vegetation. Moreover, vehicles 12 are depicted that are on this street 11. The respective road signs are not depicted in this figure. The dashed lines indicate a parking zone 13. The depiction on a monitor can be provided in color according to the invention, for example using a green marking for available parking zones 13. By contrast, the area 14 denoted by shading is a no stopping zone 14. This can be depicted in red, for example, on an applicable monitor. The parking zone 13 and the no stopping zone 14 are attributes of the KML file and are superimposed on the original panorama image 4 (satellite image) in the visualization. This results in a familiar look, for the user, of a panorama image in which the applicable parking zones 13 or no stopping zones 14 are clearly recognizable. Since the depiction uses historic data, it is not possible to infer the actually existing parking spots in this case.

Figure 3:
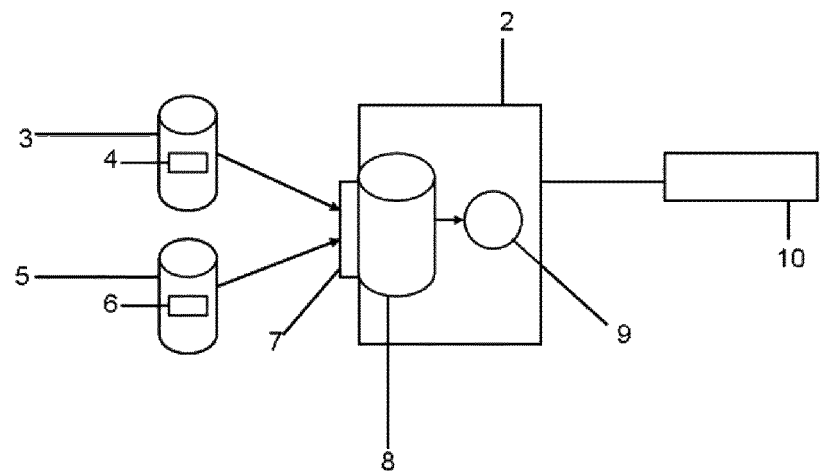
FIG. 3 is a schematic depiction of an embodiment of the system according to the invention.

FIG. 3 now shows a system 1 according to the invention for the automatic detection of parking zones in at least one street in the form of a schematic depiction. The system 1 comprises at least one computing unit 2. Such computing units may be personal computers (PCs), laptops, notebooks, smartphones, tablets or tablet computers and the like. The computing unit 2 may also be connected via a remote connection to another input device. Remote connections of this kind may be internet applications or cloud based computer systems.

The computing unit 2 now additionally comprises an internal database 8 in which the results can be stored. This internal database 8 can also be used for storing read in images 4 and map data 6, however, in order to provide these for further computation and analysis to the image recognition software 9 or a module that contains this software.

By means of the interface 7, the computing unit 2 is provided with access to the external data memory 3 containing the panorama images 4 and to the map database 5 containing the road data 6. The interface 7 is designed such that the connection to the computing unit 2 can be made via any known data transmission paths. Such data transmission paths are LAN or WLAN data networks, Internet connections or radio links, for example.

Further, the system 1 additionally comprises a terminal 10 for outputting the information about available parking zones 13. This connection between terminal 10 and computing unit 2 is also designed in the manner already described herein for the interface 7. The terminals 10 used are apparatuses that have a monitor or screen that is suitable for the visual depiction of the information produced by the system 1. Preferences in this case are laptops, notebooks, smartphones, tablets and tablet computers.

Naturally, the computing unit 2 also comprises apparatuses for executing computer programs that the computer program product according to the invention contains. This computer program is used to carry out the method according to the invention on the computing unit 2 and to output the result on the terminal 10.

Naturally, the visualization can also be provided, according to the invention, via the monitor of a data system of an automobile or another vehicle. Many vehicles include data systems and computers that are used for capturing vehicle parameters and for navigation, for example. In such vehicle computer systems, the computer program product according to the invention can be used to carry out the method according to the invention, and the information can be depicted on the screen of the onboard navigation device, for example.

LIST OF REFERENCE SYMBOLS

1 System
2 Computing unit
3 External data memory
4 Panorama images
5 Map database
6 Road data
7 Interface
8 Internal database
9 Image recognition software
10 Terminal
11 Street
12 Vehicle
13 Parking zone
14 No stopping zone The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying parking zones on at least one street, the method comprising the acts of:
   a) receiving, by a computing unit, panorama images of the at least one street from an external data memory;
   b) receiving, by the computing unit, road data for the at least one street from a map database;
   c) generating an internal database, which internal database persists the panorama images;
   d) analyzing the received panorama images so as to identify vehicles are present on the at least one street;
   e) analyzing the received panorama images so as to identify road signs and/or traffic signs are present on the at least one street;
   f) using the analyses of the panorama images with respect to the presence of vehicles, road signs and/or traffic signs to determine, for the at least one street, where existing no-parking/no stopping zones are to be expected along the at least one street, wherein no-parking/no-stopping zones are locations where vehicles may not validly park/stop;
   g) generating and storing a data record that contains information pertaining to detected vehicles and road signs as well as markings for no-parking/no stopping zones and parking zones; and
   h) generating a composite graphic that superimposes indicia delineating areas corresponding to the expected no-parking/no-stopping zones on a plan view map of the at least one street, based on the information contained in the data record, and displaying the generated composite graphic on a terminal.

2. The method as claimed in claim 1, wherein the panorama images received in act (a) are satellite photographs or images of the at least one street that are produced by camera movements.

3. The method as claimed in claim 2, wherein the panorama images comprise information pertaining to geoposition of the panorama image, a direction of travel, a road name and/or pertaining to a depth map, wherein the information is historic data.

4. The method as claimed in claim 1, wherein the road data received in act (b) comprise information pertaining to road lanes and/or pertaining to road types.

5. The method as claimed in claim 2, wherein the information in the form of panorama images and road data is transmitted by an interface of the computing unit that is communicatively connected to the internal database, to the external data memory, and/or to the map database.

6. The method as claimed in claim 1, wherein in act (d) the analysis of the panoramic images for vehicle detection is performed by segmentation of the panorama images.

7. The method as claimed in claim 6, wherein the analysis is performed by image recognition software.

8. The method as claimed in claim 1, wherein in act (e) the analysis of the panoramic images for traffic signs and road signs is performed by recognition of shape and coloration of the road signs.

9. The method as claimed in claim 8, wherein the analysis is performed by image recognition software.

10. The method as claimed in claim 1, wherein in act (h) the information contained in the data record is visualized by virtue of said information being depicted on a separate display of a terminal.

11. A computer program product comprising a non-transitory computer readable medium having stored thereon program code that, when executed by a computing unit, carries out the method of claim 1.

12. A system for displaying parking zones with respect to at least one street, the system comprising:
   a computing unit; and
   a non-transitory computer readable medium having stored thereon program code that, when executed by the computing unit, carries out the acts of:
   a) receiving, by the computing unit, panorama images of the at least one street from an external data memory;
   b) receiving, by the computing unit, road data for the at least one street from a map database;
   c) generating an internal database, which internal database persists the panorama images;
   d) analyzing the received panorama images so as to identify vehicles present on the at least one street;
   e) analyzing the received panorama images so as to identify road signs and traffic signs present on the at least one street;
   f) using the analyses of the panorama images with respect to the presence of vehicles, road signs and traffic signs to determine, for the at least one street, where existing no-parking/no stopping zones are to be expected along the at least one street, wherein no-parking/no-stopping zones are locations where vehicles may not validly park;
   g) generating and storing a data record that contains information pertaining to detected vehicles and road signs as well as markings for no-parking/no stopping zones and parking zones; and
   h) generating a composite graphic that superimposes indicia delineating areas corresponding to the expected no-parking/no-stopping zones on a plan view map of the at least one street, based on the information contained in the data record, and displaying the generated composite graphic on a terminal.

\* \* \* \* \*